(No Model.)
F. B. TORREY.
SHEAVE.
No. 437,530.  Patented Sept. 30, 1890.
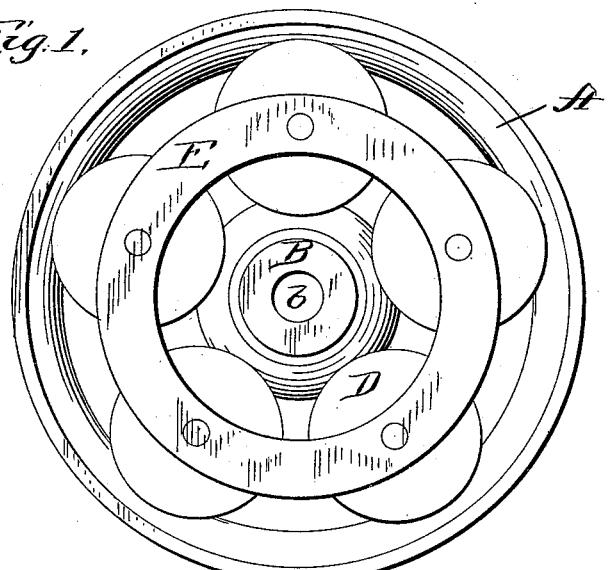
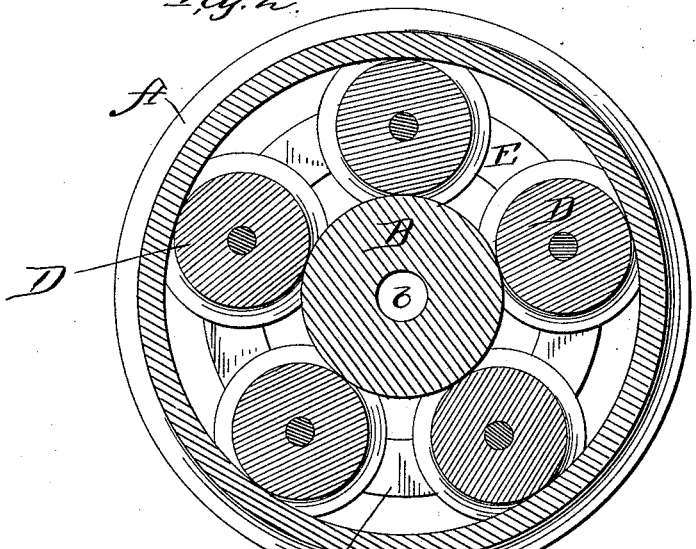
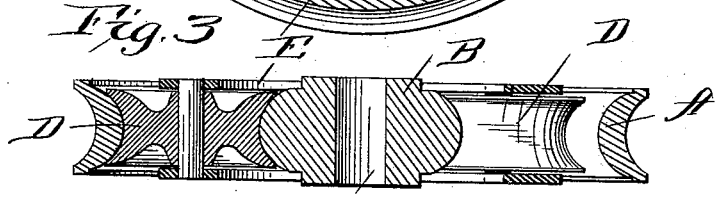
Witnesses
Walter P. Keene
Walter Donaldson
Inventor
Francis B. Torrey
by Ellis Spear
Atty.

UNITED STATES PATENT OFFICE.

FRANCIS B. TORREY, OF BATH, MAINE.

SHEAVE.

SPECIFICATION forming part of Letters Patent No. 437,530, dated September 30, 1890.

Application filed February 10, 1890. Serial No. 339,842. (No model.)

*To all whom it may concern:*

Be it known that I, FRANCIS B. TORREY, of Bath, in the county of Sagadahoc and State of Maine, have invented a new and useful Improvement in Sheaves; and I do hereby declare that the following is a full, clear, and exact description of the same.

My invention, set forth hereinafter, relates to sheaves for pulley-blocks and like purposes.

The object of the invention is to reduce the friction in said sheaves.

The invention is shown in the accompanying drawings, in which Figure 1 is a side elevation, Fig. 2 showing the section at right angles to the axis; and Fig. 3 a central transverse section.

In the drawings, A represents the rim, which is grooved, as usual, to receive the ropes on its periphery. The interior surface of the rim is rounded. The hub of the wheel is shown at B. It has a central hole $b$ for the axis or shaft, which has its bearings in the walls of the sheave. It has a rounded periphery of the same transverse section as the inner surface of the rim. Between the hub and the rim are the anti-friction wheels D. These are grooved on their peripheries to fit the rounded surfaces of the rim and hub. They are held in place by flat rings E, preferably one on each side, through which the axles of the wheels D pass, the axles being supported in these rings, by which also the parts are all held in place. The parts are slipped into place before the rings are applied. The anti-friction wheels being first placed upon the inner surface of the rim, but partly turned outward so that their outer sides will be approximately in a conical surface, then the hub is slipped in place and the whole pushed into the plane of the sheave. This is practicable by reason of the rounded inner surface of the rim and the rounded periphery of the hub, which allow the parts to turn out of the approximately conical form into a plane and thus renders it practicable to get the hub and the wheels into place within the top of the sheave without dividing the rim. Then the rings are applied and the axles of the anti-friction wheels inserted and fixed in place. The axis or shaft of the hub and the walls of the sheave hold the whole securely in the plane of the shaft. As the shaft is turned by the rope the anti-friction wheels travel around on the hub. The weight is supported by the bearing of the anti-friction wheels on the hub and there is substantially no strain or friction upon the axis of the anti-friction wheels. One ring might serve the purpose for supporting these wheels, but it is better to have one on each side.

It is better to have the hub turn on or with its shaft, in order that the whole sheave may turn on the shaft when it is running without load, and thus save wear on the anti-friction wheels; but the device is operative if the hub be made stationary.

I claim as my invention—

A sheave or wheel consisting of a rim having an interior rounded surface, a hub having a corresponding rounded periphery, grooved anti-friction wheels arranged between the rim and the hub, and a ring or rings supporting the axles of the anti-friction wheels, substantially as described.

In testimony whereof I have signed my name to this specification in the presence of two subscribing witnesses.

FRANCIS B. TORREY.

Witnesses:
  WALTER DONALDSON,
  FRANK L. DYER.